United States Patent
Song et al.

(10) Patent No.: US 12,113,632 B2
(45) Date of Patent: Oct. 8, 2024

(54) NETWORK-BASED POWER SUPPLY SYSTEM

(71) Applicant: HUAWEI TECHNOLOGIES CO., LTD., Guangdong (CN)

(72) Inventors: Weiping Song, Shenzhen (CN); Shiyong Fu, Shenzhen (CN); Yajie Cai, Suzhou (CN); Xuefeng Tang, Dongguan (CN); Houcun Zhu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 33 days.

(21) Appl. No.: 18/180,219

(22) Filed: Mar. 8, 2023

(65) Prior Publication Data
US 2023/0269107 A1    Aug. 24, 2023

Related U.S. Application Data

(63) Continuation of application No. PCT/CN2020/114135, filed on Sep. 9, 2020.

(51) Int. Cl.
| G06F 1/26 | (2006.01) |
| H04L 12/10 | (2006.01) |
| H04L 12/40 | (2006.01) |
| H04L 12/28 | (2006.01) |

(52) U.S. Cl.
CPC ........ H04L 12/10 (2013.01); H04L 12/40045 (2013.01); *H04L 2012/2845* (2013.01)

(58) Field of Classification Search
CPC ............... H04L 12/10; H04L 12/40045; H04L 2012/2845; Y02D 30/00; G06F 1/00; G06F 1/26; G06F 1/32
See application file for complete search history.

(56) References Cited

U.S. PATENT DOCUMENTS

| 2004/0239512 A1* | 12/2004 | Lomax, Jr. .......... H04M 19/001 361/111 |
| 2006/0053324 A1* | 3/2006 | Giat ........................ H04L 12/10 713/300 |
| 2010/0064151 A1* | 3/2010 | Saeki .................... G06F 1/3203 713/300 |
| 2020/0092118 A1* | 3/2020 | Zhuang .................. H04L 12/10 |

* cited by examiner

*Primary Examiner* — Nitin C Patel

(57) ABSTRACT

This application relates to a power consumption grading method for a network-based power supply system. The method includes: when it is detected that power overload protection is not triggered, starting a plurality of power modules of a powered device one by one in a specific order until all the plurality of power modules are started or it is detected that the power overload protection is triggered after a specific power module is started; when it is detected that the power overload protection is triggered, selecting, according to the specific order and based on the specific power module, one or more of the plurality of power modules as a power module combination of the powered device; and determining a load power of the powered device and a corresponding power consumption level based on the power module combination.

20 Claims, 4 Drawing Sheets

NETWORK-BASED POWER SUPPLY SYSTEM

CROSS-REFERENCE TO RELATED APPLICATIONS

This application is a continuation of International Application No. PCT/CN2020/114135, filed on Sep. 9, 2020, the disclosure of which is hereby incorporated by reference in its entirety.

TECHNICAL FIELD

This application relates to the field of electronic power technologies, and in particular, to a network-based power supply system.

BACKGROUND

Power over Ethernet (POE) is also referred to as power over local area network (POL) or active Ethernet, and means that direct current power is supplied to a terminal device based on an Ethernet wiring architecture. In the POE technology, both data and electric energy can be provided by using an Ethernet network. In this way additional power sockets and power lines are not required, and a cable architecture of an existing Ethernet network is not changed. Further, remote power-on and power-off capabilities are provided, so that the technology is widely used in application scenarios such as wireless networks, security surveillance, smart grids, and long-distance power supply. In a USB technology, both data and electric energy can also be provided. However, the USB technology and a related standard are applicable to short-distance applications, and a distance between a power source and a device is usually not greater than 5 meters. In addition, a power of a power source used for USB power supply is low, and is usually not greater than 2.5 W. The POE technology may be used in high-power terminals and long-distance applications. According to the POE power supply standard IEEE 802.3 BT, a maximum power of a power supply end used for POE power supply may reach 90 W, and a power of a terminal device may reach 71.3 W.

Different types of terminal devices may be connected to a POE power supply network, and unique functions and required powers of the terminal devices become increasingly complex. To facilitate management, devices of different manufacturers need to be able to discover and exchange systems and configuration information with each other over the network. A link layer discovery protocol (LLDP) allows a device connected to a network to send information such as a main capability, a management address, a device identifier, and an interface identifier of the device to another device on the same network. An administrator of a POE system may establish, according to the LLDP, information such as a connection status, a device type, and a power consumption level of a terminal device in the POE system, and perform power allocation and power supply based on the information. However, in a power supply scenario that does not support the LLDP, the administrator of the POE system cannot learn of information such as the power consumption level of the terminal device according to the LLDP; and may determine the power consumption level of the terminal device by performing a power consumption grading operation based on hardware, and perform corresponding power allocation.

In the conventional technology, a power consumption grading operation occurs between an administrator (usually a power supply end) of a POE system and a terminal device. A power loss required for the terminal device is estimated mainly by detecting an output current of a power source, and a corresponding power level is determined based on a plurality of discrete power points in a hardware grading table. The hardware grading table may be determined based on a current standard POE power supply protocol and a current industry standard. For example, a common hardware grading table specifies eight discrete power points from 3.84 W to 71 W, and a maximum interval between two power levels is 10 W. However, a status of a specific terminal device is not considered in power consumption grading and power allocation operations based on the hardware grading table, and therefore precise matching cannot be implemented for power allocation. For example, a terminal device that requires power consumption of only 41 W may be graded into a power consumption level corresponding to 51 W, which causes a waste of power consumption. In addition, that a line loss between the power supply end and the terminal device is dynamic is not considered in the power consumption grading and power allocation operations based on the hardware grading table either. In a scenario in which a network cable is long, the loss is large; and in a scenario in which a network cable is short, the loss is small. In addition, a change of the standard protocol and a resulting requirement for updating the power consumption grading operation are not considered either. For example, a plurality of power sourcing equipments manufactured before release of the IEEE 802.3 BT support an output of 90 W, but internal hardware grading tables of the power sourcing equipments do not support an updated power consumption grading requirement in the IEEE 802.3 BT. As a result, the terminal device may not be able to operate at a maximum power, or a system may be restarted due to power overload.

SUMMARY

An objective of this application is to provide a power consumption grading method for a network-based power supply system. The network-based power supply system includes power sourcing equipment and a powered device, and the power sourcing equipment supplies power to the powered device over a network. The method includes: When the powered device detects that power overload protection for the power sourcing equipment is not triggered, the powered device starts a plurality of power modules of the powered device one by one in a specific order until all the plurality of power modules are started or the powered device detects that the power overload protection for the power sourcing equipment is triggered after a specific power module is started, where the powered device detects, based on a voltage signal and a current signal that are received from the network, whether the power overload protection for the power sourcing equipment is triggered. When the powered device detects that the power overload protection for the power sourcing equipment is triggered, the network-based power supply system selects, according to the specific order and based on the specific power module, one or more of the plurality of power modules as a power module combination of the powered device. When all the plurality of power modules are started, the network-based power supply system selects the plurality of power modules as the power module combination. The network-based power supply system determines a load power of the powered device and a corresponding power consumption level based on the power module combination. In this way, the plurality of power modules of the powered device are started one by one in the specific order until all the plurality of power modules are started or it is detected that the power overload protection is triggered after the specific power module is started, a fine-grained power consumption grading operation and precise power matching for a specific case are implemented, and utilization of a power of the powered device is maximized when a waste of power consumption and a line loss are considered. Specific application scenarios include but are not limited to a wireless network, security surveillance, a smart grid, a long-distance smart grid, and the like.

According to a first aspect, an embodiment of this application provides a power consumption grading method for a network-based power supply system. The network-based power supply system includes power sourcing equipment and a powered device. The power sourcing equipment supplies power to the powered device over a network. The method includes: When the powered device detects that power overload protection for the power sourcing equipment is not triggered, the powered device starts a plurality of power modules of the powered device one by one in a specific order until all the plurality of power modules are started or the powered device detects that the power overload protection for the power sourcing equipment is triggered after a specific power module is started, where the powered device detects, based on a voltage signal and a current signal that are received from the network, whether the power overload protection for the power sourcing equipment is triggered. When the powered device detects that the power overload protection for the power sourcing equipment is triggered, the network-based power supply system selects, according to the specific order and based on the specific power module, one or more of the plurality of power modules as a power module combination of the powered device. When all the plurality of power modules are started, the network-based power supply system selects the plurality of power modules as the power module combination. The network-based power supply system determines a load power of the powered device and a corresponding power consumption level based on the power module combination.

In the technical solution described in the first aspect, the plurality of power modules of the powered device are started one by one in the specific order until all the plurality of power modules are started or it is detected that the power overload protection is triggered after the specific power module is started. In this way, a fine-grained power consumption grading operation and precise power matching for a specific case are implemented, and utilization of a power of the powered device is maximized when a waste of power consumption and a line loss are considered.

According to the first aspect, in a possible implementation, that the powered device starts a plurality of power modules of the powered device one by one in a specific order includes: starting, from the first power module of a first power module sequence, power modules of the first power module sequence one by one according to an order of the first power module sequence, where the plurality of power modules are arranged in ascending order of powers required by the power modules to obtain the first power module sequence.

In this way, a power module that requires a lowest power can be preferentially started, thereby facilitating optimization of power allocation.

According to the first aspect, in a possible implementation, that the network-based power supply system selects, according to the specific order and based on the specific power module, one or more of the plurality of power modules as a power module combination of the powered device includes: determining a position of the specific power module in the first power module sequence; and selecting a power module located before the position in the first power module sequence as the power module combination.

In this way, the power module combination is determined according to the specific order and based on the specific power module, thereby implementing a fine-grained power consumption grading operation for a specific status of the powered device.

According to the first aspect, in a possible implementation, that the powered device starts a plurality of power modules of the powered device one by one in a specific order includes: starting, from the first power module of a first power module sequence, power modules of the first power module sequence at intervals according to an order of the first power module sequence in a manner of selecting every second power module, where the plurality of power modules are arranged in ascending order of powers required by the power modules to obtain the first power module sequence.

In this way, a power module that requires a lowest power can be preferentially started, thereby facilitating optimization of power allocation. In addition, inspection efficiency is improved by selecting every second power module.

According to the first aspect, in a possible implementation, that the network-based power supply system selects, according to the specific order and based on the specific power module, one or more of the plurality of power modules as a power module combination of the powered device includes: determining a position of the specific power module in the first power module sequence; restarting the power sourcing equipment, and starting a second specific power module that is located before and that is adjacent to the position in the first power module sequence; when the power overload protection is not triggered, selecting the second specific power module and a power module located before the specific power module in the plurality of power modules according to the specific order as the power module combination; and when the power overload protection is triggered, selecting the power module located before the specific power module in the plurality of power modules according to the specific order as the power module combination.

In this way, the power module combination is determined according to the specific order and based on the specific power module, thereby implementing a fine-grained power consumption grading operation for a specific status of the powered device. In addition, inspection efficiency is improved by restarting the power sourcing equipment and starting the second specific power module.

According to the first aspect, in a possible implementation, that the powered device starts a plurality of power modules of the powered device one by one in a specific order includes: starting, from the first power module of a first power module sequence, power modules of the first power module sequence at intervals according to an order of the first power module sequence in a manner of selecting every third power module, where the plurality of power modules are arranged in ascending order of powers required by the power modules to obtain the first power module sequence.

In this way, a power module that requires a lowest power can be preferentially started, thereby facilitating optimization of power allocation. In addition, check efficiency is improved by selecting every third power module.

According to the first aspect, in a possible implementation, that the network-based power supply system selects, according to the specific order and based on the specific power module, one or more of the plurality of power modules as a power module combination of the powered device includes: determining a position of the specific power module in the first power module sequence; restarting the power sourcing equipment, and starting a second specific power module that is located before and that is adjacent to the position in the first power module sequence; when the power overload protection is not triggered, selecting the second specific power module and a power module located before the specific power module in the plurality of power modules according to the specific order as the power module combination; when the power overload protection is triggered, restarting the power sourcing equipment, and starting a third specific power module, in the first power module sequence, that is located before and that is adjacent to a position of the second specific power module in the first power module sequence; when the power overload protection is not triggered, selecting the third specific power module and the power module located before the specific power module in the plurality of power modules according to the specific order as the power module combination; and when the power overload protection is triggered, selecting the power module located before the specific power module in the plurality of power modules according to the specific order as the power module combination.

In this way, the power module combination is determined according to the specific order and based on the specific power module, thereby implementing a fine-grained power consumption grading operation for a specific status of the powered device. In addition, inspection efficiency is improved by restarting the power sourcing equipment and starting the second specific power module, and by restarting the power sourcing equipment and starting the third specific power module.

According to the first aspect, in a possible implementation, that the powered device starts a plurality of power modules of the powered device one by one in a specific order includes: starting, from the first power module of a first power module sequence, power modules of the first power module sequence one by one according to an order of the first power module sequence, where the plurality of power modules are arranged in descending order of priorities of the plurality of power modules to obtain the first power module sequence.

In this way, a power module with a highest priority can be preferentially started, thereby facilitating optimization of power allocation.

According to the first aspect, in a possible implementation, that the network-based power supply system selects, according to the specific order and based on the specific power module, one or more of the plurality of power modules as a power module combination of the powered device includes: determining a position of the specific power module in the first power module sequence; and selecting a power module located before the position in the first power module sequence as the power module combination.

In this way, the power module combination is determined according to the specific order and based on the specific power module, thereby implementing a fine-grained power consumption grading operation for a specific status of the powered device.

According to the first aspect, in a possible implementation, a priority of a power module related to a basic function of the powered device is higher than a priority of a power module related to an extended function of the powered device.

In this way, the power module related to the basic function is set to have a higher priority, so that power allocation can be preferentially performed for the basic function of the powered device.

According to the first aspect, in a possible implementation, the specific order is determined based on a control model and a power level that correspond to the powered device.

In this way, the specific order for starting the power modules can be determined based on the control model and the power level of the powered device, thereby facilitating fine-grained power control.

According to the first aspect, in a possible implementation, the network-based power supply system compares the load power determined based on the power module combination with a protocol power determined according to a link layer discovery protocol, and selects a higher one as the load power of the powered device.

In this way, the load power of the powered device can be determined with reference to the link layer discovery protocol. This helps implement a fine-grained power consumption grading operation for the powered device.

According to a second aspect, an embodiment of this application provides a powered device powered based on a network. The powered device receives electric energy over the network. The powered device includes a detector, where the detector is configured to detect, based on a voltage signal and a current signal that are received from the network, whether power overload protection is triggered; a plurality of power modules; and a controller. The controller is configured to: when the detector detects that the power overload protection is not triggered, start the plurality of power modules one by one in a specific order until all the plurality of power modules are started or the detector detects that the power overload protection is triggered after a specific power module is started; when the detector detects that the power overload protection is triggered, select, according to the specific order and based on the specific power module, one or more of the plurality of power modules as a power module combination of the powered device; when all the plurality of power modules are started, select the plurality of power modules as the power module combination; and determine a load power of the powered device based on the power module combination.

In the technical solution described in the second aspect, the plurality of power modules of the powered device are started one by one in the specific order until all the plurality of power modules are started or it is detected that the power overload protection is triggered after the specific power module is started. In this way, a fine-grained power consumption grading operation and precise power matching for a specific case are implemented, and utilization of a power of the powered device is maximized when a waste of power consumption and a line loss are considered.

With reference to the second aspect, in a possible implementation, the starting a plurality of power modules of the powered device one by one in a specific order includes: starting, from the first power module of a first power module sequence, power modules of the first power module sequence one by one according to an order of the first power module sequence, where the plurality of power modules are arranged in ascending order of powers required by the power modules to obtain the first power module sequence.

In this way, a power module that requires a lowest power can be preferentially started, thereby facilitating optimization of power allocation.

According to the second aspect, in a possible implementation, the selecting, according to the specific order and based on the specific power module, one or more of the plurality of power modules as a power module combination of the powered device includes: determining a position of the specific power module in the first power module sequence; and selecting a power module located before the position in the first power module sequence as the power module combination.

In this way, the power module combination is determined according to the specific order and based on the specific power module, thereby implementing a fine-grained power consumption grading operation for a specific status of the powered device.

According to the second aspect, in a possible implementation, the starting a plurality of power modules of the powered device one by one in a specific order includes: starting, from the first power module of a first power module sequence, power modules of the first power module sequence at intervals according to an order of the first power module sequence in a manner of selecting every second power module, where the plurality of power modules are arranged in ascending order of powers required by the power modules to obtain the first power module sequence.

In this way, a power module that requires a lowest power can be preferentially started, thereby facilitating optimization of power allocation. In addition, inspection efficiency is improved by selecting every second power module.

According to the second aspect, in a possible implementation, the selecting, according to the specific order and based on the specific power module, one or more of the plurality of power modules as a power module combination of the powered device includes: determining a position of the specific power module in the first power module sequence; restarting the power sourcing equipment, and starting a second specific power module that is located before and that is adjacent to the position in the first power module sequence; when the power overload protection is not triggered, selecting the second specific power module and a power module located before the specific power module in the plurality of power modules according to the specific order as the power module combination; and when the power overload protection is triggered, selecting the power module located before the specific power module in the plurality of power modules according to the specific order as the power module combination.

In this way, the power module combination is determined according to the specific order and based on the specific power module, thereby implementing a fine-grained power consumption grading operation for a specific status of the powered device. In addition, inspection efficiency is improved by restarting the power sourcing equipment and starting the second specific power module.

According to the second aspect, in a possible implementation, the starting a plurality of power modules of the powered device one by one in a specific order includes: starting, from the first power module of a first power module sequence, power modules of the first power module sequence at intervals according to an order of the first power module sequence in a manner of selecting every third power module, where the plurality of power modules are arranged in ascending order of powers required by the power modules to obtain the first power module sequence.

In this way, a power module that requires a lowest power can be preferentially started, thereby facilitating optimization of power allocation. In addition, check efficiency is improved by selecting every third power module.

According to the second aspect, in a possible implementation, the selecting, according to the specific order and based on the specific power module, one or more of the plurality of power modules as a power module combination of the powered device includes: determining a position of the specific power module in the first power module sequence; restarting the power sourcing equipment, and starting a second specific power module that is located before and that is adjacent to the position in the first power module sequence; when the power overload protection is not triggered, selecting the second specific power module and a power module located before the specific power module in the plurality of power modules according to the specific order as the power module combination; when the power overload protection is triggered, restarting the power sourcing equipment, and starting a third specific power module, in the first power module sequence, that is located before and that is adjacent to a position of the second specific power module in the first power module sequence; when the power overload protection is not triggered, selecting the third specific power module and the power module located before the specific power module in the plurality of power modules according to the specific order as the power module combination; and when the power overload protection is triggered, selecting the power module located before the specific power module in the plurality of power modules according to the specific order as the power module combination.

In this way, the power module combination is determined according to the specific order and based on the specific power module, thereby implementing a fine-grained power consumption grading operation for a specific status of the powered device. In addition, inspection efficiency is improved by restarting the power sourcing equipment and starting the second specific power module, and by restarting the power sourcing equipment and starting the third specific power module.

According to the second aspect, in a possible implementation, the starting a plurality of power modules of the powered device one by one in a specific order includes: starting, from the first power module of a first power module sequence, power modules of the first power module sequence one by one according to an order of the first power module sequence, where the plurality of power modules are arranged in descending order of priorities of the plurality of power modules to obtain the first power module sequence.

In this way, a power module with a highest priority can be preferentially started, thereby facilitating optimization of power allocation.

According to the second aspect, in a possible implementation, the selecting, according to the specific order and based on the specific power module, one or more of the plurality of power modules as a power module combination of the powered device includes: determining a position of the specific power module in the first power module sequence; and selecting a power module located before the position in the first power module sequence as the power module combination.

In this way, the power module combination is determined according to the specific order and based on the specific power module, thereby implementing a fine-grained power consumption grading operation for a specific status of the powered device.

According to the second aspect, in a possible implementation, a priority of a power module related to a basic function of the powered device is higher than a priority of a power module related to an extended function of the powered device.

In this way, the power module related to the basic function is set to have a higher priority, so that power allocation can be preferentially performed for the basic function of the powered device.

According to the second aspect, in a possible implementation, the specific order is determined based on a control model and a power level that correspond to the powered device.

In this way, the specific order for starting the power modules can be determined based on the control model and the power level of the powered device, thereby facilitating fine-grained power control.

According to the second aspect, in a possible implementation, the controller is further configured to: compare the load power determined based on the power module combination with a protocol power determined according to a link layer discovery protocol, and select a higher one as the load power of the powered device.

In this way, the load power of the powered device can be determined with reference to the link layer discovery protocol. This helps implement a fine-grained power consumption grading operation for the powered device.

According to the second aspect, in a possible implementation, a network-based power supply system includes the power sourcing equipment, and the network-based power supply system determines a power consumption level of the powered device based on the load power of the powered device.

In this way, the network-based power supply system can perform a fine-grained power consumption grading operation on the powered device.

BRIEF DESCRIPTION OF DRAWINGS

To describe technical solutions in embodiments of this application or in the background more clearly, the following describes accompanying drawings used in embodiments of this application or in the background.

DESCRIPTION OF EMBODIMENTS

An embodiment of this application provides a power consumption grading method for a network-based power supply system. The network-based power supply system includes power sourcing equipment and a powered device, and the power sourcing equipment supplies power to the powered device through a network. The method includes: When the powered device detects that power overload protection for the power sourcing equipment is not triggered, the powered device starts a plurality of power modules of the powered device one by one in a specific order, until all the plurality of power modules are started or the powered device detects that the power overload protection for the power sourcing equipment is triggered after a specific power module is started, where the powered device detects, based on a voltage signal and a current signal that are received from the network, whether the power overload protection for the power sourcing equipment is triggered. When the powered device detects that the power overload protection for the power sourcing equipment is triggered, the network-based power supply system selects, according to the specific order and based on the specific power module, one or more of the plurality of power modules as a power module combination of the powered device. When all the plurality of power modules are started, the network-based power supply system selects the plurality of power modules as the power module combination. The network-based power supply system determines a load power of the powered device and a corresponding power consumption level based on the power module combination. In this way, the plurality of power modules of the powered device are started one by one in the specific order, until all the plurality of power modules are started or it is detected that the power overload protection is triggered after the specific power module is started, thereby implementing a fine-grained power consumption grading operation and precise power matching for a specific case. A waste of power consumption and a line loss are considered, thereby maximizing utilization of a power of the powered device.

This embodiment of this application may be applied to the following application scenarios; a wireless network, security surveillance, a smart grid, a long-distance smart grid, and the like.

This embodiment of this application may be adjusted and improved based on a specific application environment. This is not specifically limited herein.

To make a person skilled in the art better understand technical solutions in this application, the following describes technical solutions in embodiments of this application with reference to accompanying drawings in embodiments of this application.

Figure 1:
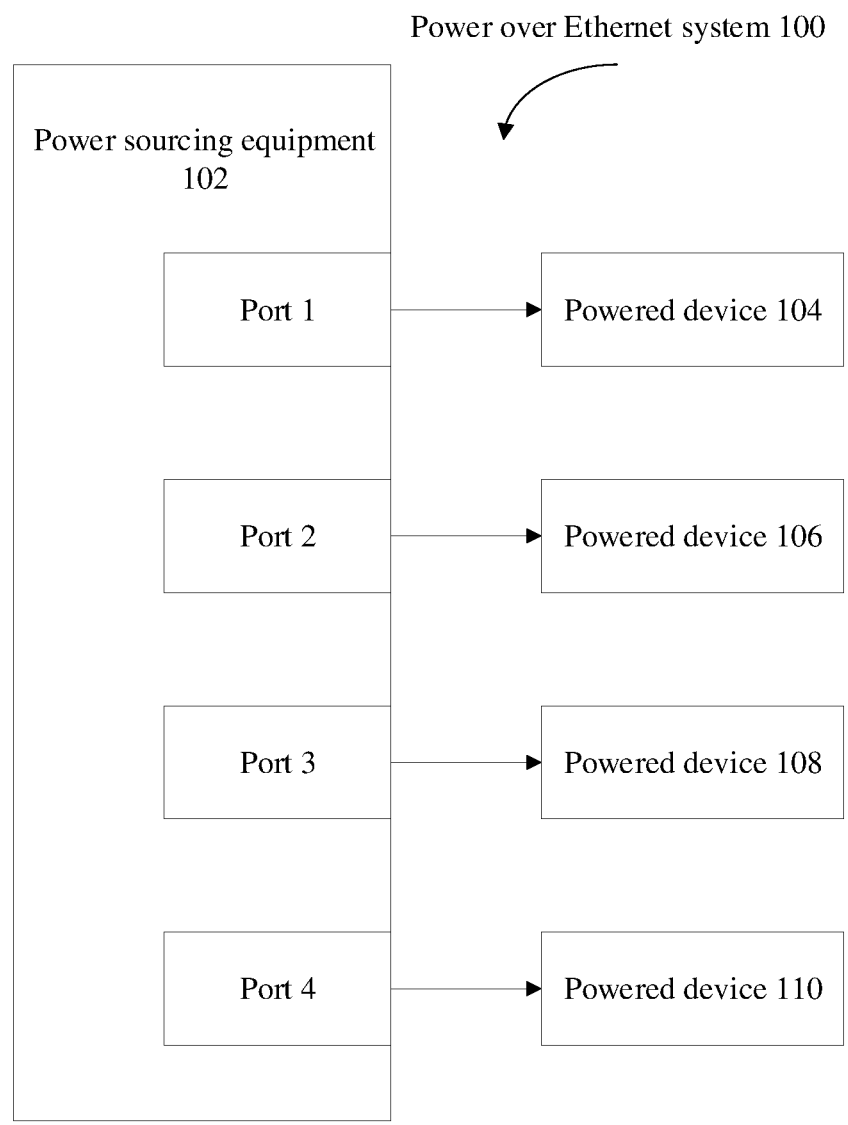
FIG. 1 is a schematic diagram of a structure of a power over Ethernet system according to an embodiment of this application.

FIG. 1 is a schematic diagram of a structure of a power over Ethernet system according to an embodiment of this application. As shown in FIG. 1, a power over Ethernet (POE) system 100 includes power sourcing equipment (PSE) 102 and a plurality of powered devices (PD) 104, 106, 108, and 110. The power sourcing equipment 102 includes ports 1, 2, 3, and 4 that respectively correspond to the powered device 104, the powered device 106, the powered device 108, and the powered device 110. The POE system 100 is connected to a plurality of clients or terminal devices, and supplies power to these clients. In terms of power allocation and power consumption grading operations, these clients may be abstracted into powered devices that are respectively connected to the ports of the power sourcing equipment 102. For example, the powered device 104 may be an internet protocol (IP)-based IP telephone set connected to the port 1, and the IP telephone set is powered through the port 1. The powered device 106 may be an IP camera (IPC) connected to the port 2, and the IPC is powered through the port 2. The powered device 108 may be a wireless network access point (AP) connected to the port 3. The wireless network AP may be a wireless switch or router, and is powered through the port 3. The powered device 110 may be another Ethernet device, such as a personal digital assistant (PDA) or a mobile phone, that is connected to the port 4. A sum of powers respectively output by all the ports of the power sourcing equipment 102 is an output power of the power sourcing equipment 102, and is also a total supply power of the power sourcing equipment 102. The power sourcing equipment 102 allocates powers and supplies power to each powered device connected to each port. For example, a power provided for the IP telephone set through the port 1 may be different from a power provided for the IPC through the port 2. A total quantity of ports, of the power sourcing equipment 102, that can be enabled varies based on different standards used and according to different requirements of specific connected clients. A single port of the power sourcing equipment 102 has a maximum single-port supply power corresponding to the port, and clients or powered devices connected to the port may be of different types, and have a unique function and a power required for implementing the unique function. A specific powered device may also have different operating states or operating modes, and have corresponding different power requirements. When the power sourcing equipment 102 supports the link layer discovery protocol (LLDP), information such as a characteristic and a power requirement of a powered device connected to a port may be transmitted to the power sourcing equipment 102 by using the LLDP, so that the power sourcing equipment 102 can perform power allocation and power supply based on the information. When the power sourcing equipment 102 does not support the LLDP, a power required by a powered device needs to be determined in another manner, to perform power allocation and power supply.

As shown in FIG. 1, an operating process between the power sourcing equipment 102 and the powered device 104 is used as an example. Before starting to supply power, the power sourcing equipment 102 detects whether a device is connected to the port 1. After the powered device 104 is connected to the port 1, the power sourcing equipment 102 detects whether the powered device 104 is a powered device that supports POE power supply, for example, a powered device that meets a requirement of IEEE 802.3 BT. If a detection result feeds back that the powered device 104 does not support the POE power supply, the operating process is terminated. If the detection result feeds back that the powered device 104 supports the POE power supply, a fine-grained power consumption grading operation and precise power matching may be performed for the powered device.

Still as shown in FIG. 1, the power sourcing equipment 102 is connected to the powered devices 104, 106, 108, and 110 by using transmission lines of an Ethernet network. Specifically, a direct current may be transmitted through an Ethernet transmission cable, for example, a twisted pair. A mid-span method may be used, to be specific, a direct current is transmitted through an idle wire pair in the Ethernet cable. Alternatively, an end-span method may be used, to be specific, a core wire used for data transmission in the Ethernet cable is also used to transmit a direct current, but a frequency used for power transmission is different from that of a data signal.

The ports 1, 2, 3, and 4 are shown in the embodiment shown in FIG. 1. It should be understood that the quantity of ports shown in FIG. 1 is merely an example. In some example embodiments, another quantity of ports may be included. For example, the power sourcing equipment 102 may have a total of 12 ports, and each port provides a maximum single-port supply power of 30 W according to the IEEE 802.3 AT standard. A specific quantity of ports and a total supply power of the power sourcing equipment 102 may be determined based on an actual situation. This is not limited herein.

As shown in FIG. 1, the power over Ethernet system 100 shown in FIG. 1 may be alternatively used in another network architecture or network layout, that is, may be understood as a network-based power supply system including power sourcing equipment and a powered device, where the power sourcing equipment supplies power to the powered device through a network.

Figure 2:
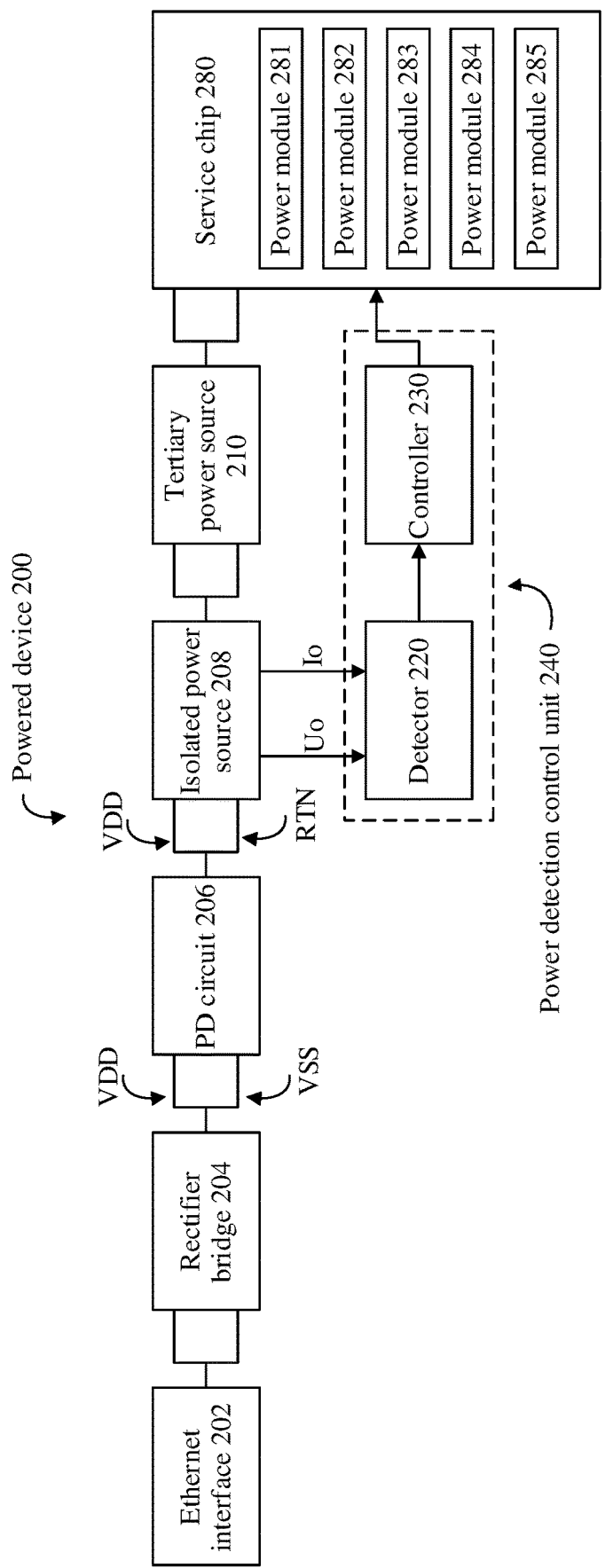
FIG. 2 is a schematic diagram of a structure of a powered device according to an embodiment of this application.

FIG. 2 is a schematic diagram of a structure of a powered device according to an embodiment of this application. As shown in FIG. 2, the powered device 200 includes an Ethernet interface 202, a rectifier bridge 204, a powered device circuit 206, an isolated power source 208, a tertiary power source 210, a detector 220, a controller 230, and a service chip 280. The service chip 280 includes a plurality of power modules 281, 282, 283, 284, and 285. The detector 220 and the controller 230 constitute a power detection control unit 240. The powered device 200 may correspond to one of the plurality of powered devices in the POE system 100 shown in FIG. 1, or may be a separately disposed powered device 200. The powered device 200 may be used in an operating mode in which a POE switch supplies power, or may be used in an operating mode in which another device supplies power. The Ethernet interface 202 is configured to connect to a transmission cable of an Ethernet network and receive direct-current electric energy. The transmission cable may be a twisted pair. Electric energy may be transmitted through an idle wire pair in the cable, or a core wire used for data transmission in the cable is also used to transmit a direct current, but a frequency used for power transmission is different from that of a data signal. The Ethernet interface 202 is sequentially connected to the rectifier bridge 204 and the powered device circuit 206. A voltage signal received by the Ethernet interface 202 from the outside of the powered device 200 may include both a power transmission voltage and a data signal. The rectifier bridge 204 and the powered device circuit 206 are jointly configured to perform frequency division on a voltage and a signal, and perform rectification on a voltage obtained through division for power supply. As shown in FIG. 2, VDD is used to indicate a positive power input, VSS is used to indicate a negative power input, and an input voltage transmitted from the rectifier bridge 204 to the powered device circuit 206 is between the VDD and the VSS. The powered device circuit 206 may include a metal-oxide semiconductor field-effect transistor (MOSFET)-based bridge topology used for rectification and isolation. RTN in FIG. 2 is used to indicate a drain of the isolated MOSFET, and the VDD and the RTN are subsequently connected to the isolated power source 208. The isolated power source 208 may be a direct current-to-direct current converter, and is configured to convert an input voltage source indicated by the VDD into other specifications to meet a subsequent requirement. The isolated power source 208 may be understood as a secondary power source, and the isolated power source 208 is connected to the tertiary power source 210. The tertiary power source 210 is configured to further convert electric energy output by the isolated power source 208 into electric energy suitable for the service chip 280. In some possible implementations, the service chip 280 may be directly connected to the isolated energy 208 without using the tertiary power source 210.

Still as shown in FIG. 2, the service chip 280 includes the plurality of power modules 281 to 285. The power modules 281 to 285 are used to represent that the powered device 200 has different power requirements for different cases, or may represent different power levels of the powered device 200 and corresponding modules or control models. For example, the powered device 200 is an IPC, and may be used in security surveillance and other fields. The IPC may operate in different modes in different cases, for example, in a night operating mode. In different modes, different components or component combinations may be used, and there are different power requirements. For example, in the daytime, the IPC operates in a normal mode, and corresponds to the power module 281. At night, the IPC switches to the night operating mode, and a camera and a processing chip that are suitable for night photographing are invoked. The camera and the processing chip correspond to the power module 282. Therefore, the IPC enables the power module 281 in the daytime, and enables the power module 282 at night. Alternatively, the IPC enables the power module 281 in the daytime, and enables both the power modules 281 and 282 at night. That is, the plurality of power modules 281 to 285 of the service chip 280 may respectively correspond to powers required by the powered device 200 to implement different functions, or may correspond to power requirements for enabling different components of the powered device 200. From a perspective of a POE power supply management operation, a total power requirement of the service chip 280 is a sum of power requirements of enabled power modules. In addition to the total power requirement of the service chip 280, factors such as losses of rectifier and isolating circuits, device losses, and impact of parasitic capacitors and inductors need to be considered for a power requirement externally presented by the powered device 200. Therefore, a total power requirement of the powered device 200 may be changed by enabling different power modules. An order of starting the power modules, in other words, a power module sequence including the started power modules, may be arranged in ascending order of powers required by the power modules, or may be arranged in descending order of powers required by the power modules, or may be arranged in descending order of priorities of the power modules. A specific startup manner may be starting the power modules one by one. For example, the power modules are started in the following order: the power module 281, the power module 282, the power module 283, the power module 284, and the power module 285. Alternatively, the power modules may be started at intervals in a manner of selecting every second power module. For example, the power modules are started in the following order: the power module 281, the power module 283, and the power module 285. Based on different orders and combinations of enabled power modules and powers required by the power modules, the powered device 200 may externally present different total power requirements, or may correspond to different power consumption levels.

The power modules 281 to 285 are shown in the embodiment shown in FIG. 2. It should be understood that the quantity of power modules shown in FIG. 2 is merely an example. In some example embodiments, another quantity of power modules may be included, and the powered device 200 may be alternatively of another device type. For example, the powered device 200 may be a powered device A that is a personal digital assistant, and includes 20 power modules. The power modules may correspond to a plurality of operating states and operating modes of the powered device A according to a startup order and based on a startup combination. This may be determined based on an actual situation, and is not limited herein.

Still as shown in FIG. 2, the powered device 200 further includes a power detection control unit 240. The power detection control unit 240 receives a voltage signal Uo and a current signal Io from the isolated power source 208, and is communicatively connected to the service chip 280. The isolated power source 208 receives input electric energy from the outside through the rectifier bridge 204 and the powered device circuit 206, and converts the input electric energy into other specifications. Therefore, the voltage signal Uo and the current signal Io that are transmitted by the isolated power source 208 to the power detection control unit 240 may reflect an external power supply status. When the powered device 200 receives power supply from power sourcing equipment (not shown) through the Ethernet interface 202 and an Ethernet network, the voltage signal Uo and the current signal Io may reflect a "power failure" status of the power sourcing equipment. Specifically, when a "power failure" occurs on the power sourcing equipment, that is, a power overload protection mechanism of the power sourcing equipment is triggered, this also means that a power output by the power sourcing equipment exceeds a safe range or a threshold for triggering protection. In this case, the powered device 200 may determine, by detecting the voltage signal Uo and the current signal Io, that a "power failure" occurs on the power sourcing equipment. Likewise, the powered device 200 may determine, by detecting the voltage signal Uo and the current signal Io, that no "power failure" occurs on the power sourcing equipment, that is, the power overload protection mechanism of the power sourcing equipment is not triggered. This also means that a power output by the power sourcing equipment does not exceed the safe range. When the isolated power source 208 is a direct current-to-direct current converter, the powered device 200 may detect a voltage signal and a current signal before conversion, or may detect a voltage signal and a current signal after conversion. In a specific detection manner, a sampled signal of a built-in powered device chip or the isolated power source 208, or another proper technical means may be used. This is not specifically limited herein.

Still as shown in FIG. 2, the power detection control unit 240 may include a detector 220 and a controller 230. The detector 220 is configured to receive the voltage signal Uo and the current signal Io from the isolated power source 208. The controller 230 is configured to communicatively connect to the service chip 280 and control enabling and disabling of the plurality of power modules 281 to 285 of the service chip 280. Each of the plurality of power modules 281 to 285 of the service chip 280 has a corresponding power control switch, and the controller 230 sends a corresponding power control signal to each power control switch, to separately control enabling and disabling of the power modules 281 to 285. The power control switch may be implemented by using a specific switch structure, for example, by controlling switching-on and switching-off of a switch transistor. Alternatively, the power control switch may be implemented by software controlling the service chip 280, for example, implemented by a processor running a program stored in a computer-readable medium. The controller 230 is communicatively connected to the detector 220, and may determine, by using the detector 220 based on the voltage signal Uo and the current signal Io, whether a "power failure" occurs on the power sourcing equipment, and correspondingly determine a control operation on the service chip 280. The detector 220 and the controller 230 may be separately disposed, or may be integrated, or a corresponding function may be implemented by a processor running a program stored in a computer-readable memory. For example, the power detection control unit 240 may include a processor and a computer-readable medium, and the processor runs a program stored in the computer-readable medium to send a power control signal to the service chip 280.

Figure 3:
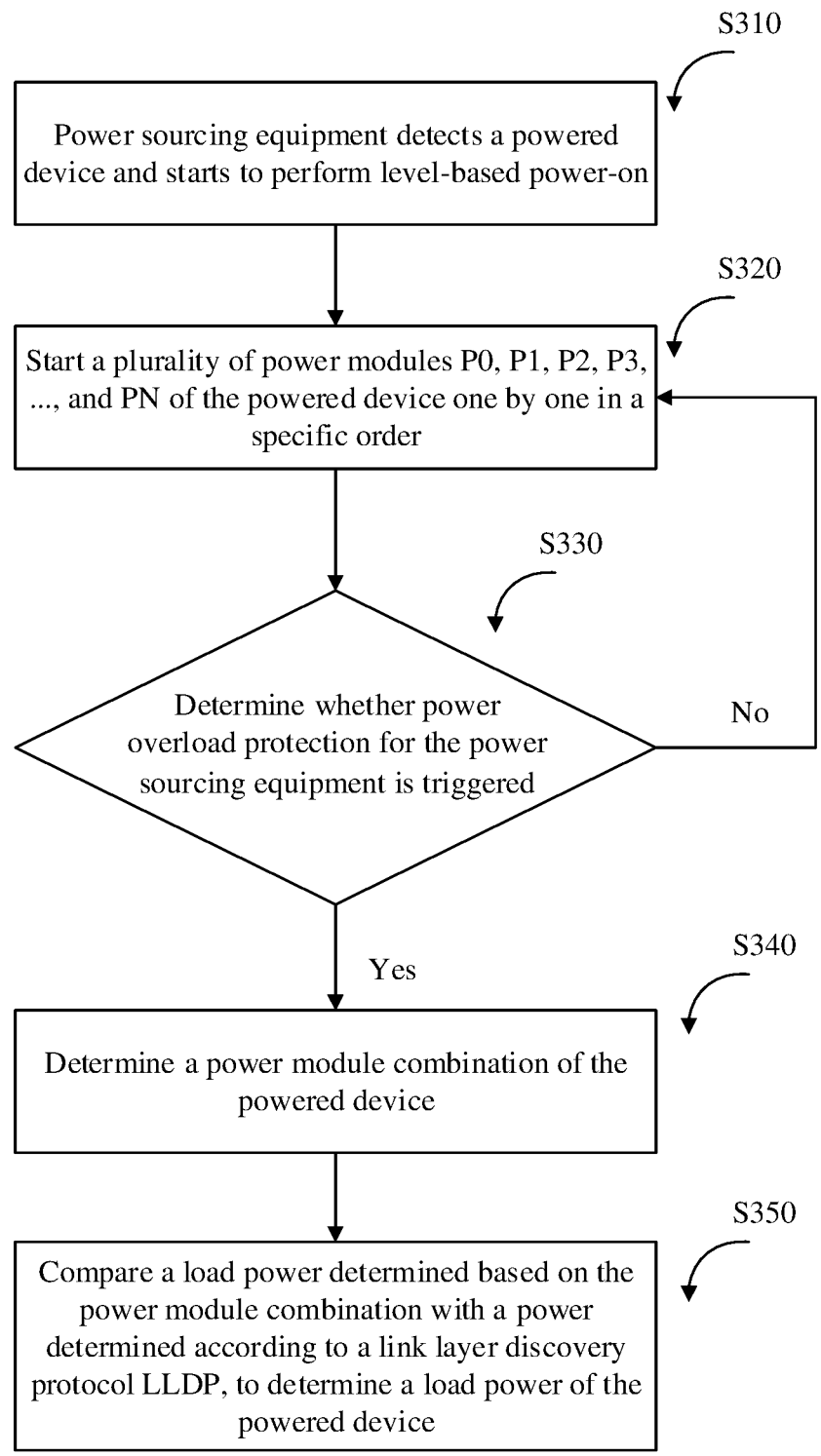
FIG. 3 is a schematic flowchart of a power control method for a powered device in an implementation according to an embodiment of this application.

FIG. 3 is a schematic flowchart of a power control method for a powered device in an implementation according to an embodiment of this application. Specifically, the method includes the following steps.

Step S310: Power sourcing equipment detects a powered device and starts to perform level-based power-on.

A POE system includes two parts: power sourcing equipment located on a power sourcing side and a powered device located on a powered side. When the powered device is connected to the POE system through an Ethernet network, the power sourcing equipment may detect a connection status of the powered device, and start to determine a power consumption level of the powered device and supply power, that is, perform level-based power-on.

In some example embodiments, before starting to perform level-based power-on, the power sourcing equipment may further detect whether the powered device is a powered device that supports a related POE protocol standard. If the powered device does not comply with the related protocol standard, level-based power-on is not performed.

In some example embodiments, the powered device may be various types of terminal devices, for example, an IP telephone set, an IP camera, a wireless switch, or the powered device A. The power sourcing equipment may transmit a direct current through an Ethernet transmission cable, for example, a twisted pair, and may use a mid-span method or an end-span method.

Step S320: Start a plurality of power modules P0, P1, P2, P3, . . . , and PN of the powered device one by one in a specific order.

The powered device includes the plurality of power modules P0, P1, P2, P3, . . . , and PN, where N is a positive integer. The power modules P0, P1, P2, P3, . . . , and PN are used to represent that the powered device has different power requirements for different cases, or may represent different power levels of the powered device and corresponding modules or control models. For example, the powered device is an IPC, and may be used in security surveillance and other fields. The IPC may operate in different modes in different cases, for example, in a night operating mode. In different modes, different components or component combinations may be used, and there are different power requirements. For example, in the daytime, the IPC operates in a normal mode, and corresponds to the power module P0. At night, the IPC switches to the night operating mode, and a camera and a processing chip that are suitable for night photographing are invoked. The camera and the processing chip correspond to the power module P1. Therefore, the IPC enables the power module P0 in the daytime, and enables the power module P1 at night. Alternatively, the IPC enables the power module P0 in the daytime, and enables both the power modules P0 and P1 at night. That is, the plurality of power modules P0, P1, P2, P3, . . . , and PN may respectively correspond to powers required by the powered device to implement different functions, or may correspond to power requirements for enabling different components of the powered device. From a perspective of a POE power supply management operation, a total power requirement of the powered device is a sum of power requirements of enabled power modules. In addition to the total power requirement of the power modules P0, P1, P2, P3, . . . , and PN, factors such as losses of rectifier and isolating circuits, device losses, and impact of parasitic capacitors and inductors need to be considered for a power requirement externally presented by the powered device, that is, a power requirement from a perspective of the power sourcing equipment. Therefore, the total power requirement of the powered device may be changed by enabling different power modules.

The specific order of starting the power modules P0, P1, P2, P3, . . . , and PN may be arranged in ascending order of powers required by the power modules, or may be arranged in descending order of powers required by the power modules, or may be arranged in descending order of priorities of the power modules, or may be arranged according to another possible regularity. It should be understood that the numbers P0, P1, P2, P3, . . . , and PN of the power modules are merely for ease of representation, and do not limit a startup order or priorities of the power modules. To be specific, in the specific order, P1 may be started before P0, and P0 may be started last. This is determined according to a specific order in a specific embodiment. For example, when the power modules are arranged in ascending order of powers required for the power modules, and it is assumed that a power of the power module numbered P1 is lower than a power of the power module numbered P0, P0 is arranged after P1 in the specific ascending order. The specific order determines different orders of enabling the power modules, and also determines a combination of all enabled power modules after a specific power module is enabled, and a corresponding total external power requirement. Therefore, the powered device may adjust a total external power requirement by adjusting the specific order. The specific order of starting the power modules may be adjusted correspondingly based on a management objective, to implement fine-grained power control. For example, the specific order may be set to be arranged in ascending order of powers required by the power modules, so that a power module that requires a lowest power is started first. In this way, a power module with a low power can be preferentially started. In a possible implementation, the power modules P0, P1, P2, P3, . . . , and PN are in a one-to-one correspondence with specific physical components included in the powered device. In another possible implementation, the power modules P0, P1, P2, P3, . . . , and PN may be used to represent that the powered device has different power requirements for different cases, or may be used to represent different power levels of the powered device and corresponding modules or control models. Therefore, control flexibility and diversity may be implemented based on a to-be-achieved control objective with reference to a case and a control model corresponding to each of the power modules P0, P1, P2, P3, . . . , and PN, and according to the specific order of starting the power modules P0, P1, P2, P3, . . . , and PN.

In some example embodiments, the specific order is determined based on a control model and a power level that correspond to the powered device.

In some example embodiments, the plurality of power modules P0, P1, P2, P3, . . . , and PN are arranged in ascending order of powers required by the power modules to obtain a first power module sequence. Startup in the specific order means that, from the first power module of the first power module sequence, the power modules are started one by one according to an order of the first power module sequence. For example, a power of P3 is lower than that of P2, the power of P2 is lower than that of P0, and the power of P0 is lower than that of P1. In this case, P0, P1, P2, and P3 are arranged as P3-P2-P0-P1 in the first power module sequence, and are started in the specific order of P3-P2-P0-P1.

In some example embodiments, the plurality of power modules P0, P1, P2, P3, . . . , and PN are arranged in ascending order of powers required by the power modules to obtain a first power module sequence. Startup in the specific order means that, from the first power module of the first power module sequence, the power modules are started at internals according to an order of the first power module sequence in a manner of selecting every second power module. For example, a power of P3 is lower than that of P2, the power of P2 is lower than that of P0, and the power of P0 is lower than that of P1. In this case, P0, P1, P2, and P3 are arranged as P3-P2-P0-P1 in the first power module sequence, and in the specific order, only P3 and P0 may be started, or only P2 and P1 may be started. For another example, the first power module sequence is P0-P1-P2-P5-P4-P3. In this case, the specific order may be P0-P2-P4.

In some example embodiments, the plurality of power modules P0, P1, P2, P3, . . . , and PN are arranged in ascending order of powers required by the power modules to obtain a first power module sequence. Startup in the specific order means that, from the first power module of the first power module sequence, the power modules are started at internals according to an order of the first power module sequence in a manner of selecting every third power module. For example, it is assumed that power modules P0, P1, P2, P3, P4, and P5 are arranged in ascending order of powers required by the power modules to obtain a first power module sequence P0-P1-P2-P5-P4-P3. The power modules are started in a manner of selecting every third power module, that is, the specific order may be P0-P5.

In some example embodiments, the plurality of power modules P0, P1, P2, P3, . . . , and PN are arranged in descending order of powers required by the power modules to obtain a first power module sequence. Startup in the specific order means that, from the first power module of the first power module sequence, the power modules are started one by one according to an order of the first power module sequence. For example, a power of P3 is lower than that of P2, the power of P2 is lower than that of P0, and the power of P0 is lower than that of P1. In this case, P0, P1, P2, and P3 are arranged as P1-P0-P2-P3 in the first power module sequence, and are started in the specific order of P1-P0-P2-P3.

In some example embodiments, the plurality of power modules P0, P1, P2, P3, . . . , and PN are arranged in descending order of priorities of the power modules to obtain a first power module sequence. Startup in the specific order means that, from the first power module of the first power module sequence, the power modules are started one by one according to an order of the first power module sequence. For example, a priority of P3 is higher than that of P2, the priority of P2 is higher than that of P0, and the priority of P0 is higher than that of P1. In this case, P0, P1, P2, and P3 are arranged as P3-P2-P0-P1 in the first power module sequence, and are started in the specific order of P3-P2-P0-P1. Herein, an order of priorities of the power modules may be used to achieve different control objectives. For example, assuming that the powered device is an IP camera and an application scenario is a night operating scenario, a priority of a power module for a night operating mode may be increased, so that the power module for the night operating mode and a corresponding IP camera component are preferentially started, thereby improving night operating efficiency. In a possible implementation, a priority of a power module related to a basic function of the powered device is higher than a priority of a power module related to an extended function of the powered device. For example, assuming that the powered device is an IP camera, a power module related to implementation of a basic photographing function has a higher priority, and an extended function based on the basic photographing function may have a lower priority, so that a power is preferentially allocated to the power module related to implementation of the basic photographing function.

Step S330: Determine whether power overload protection for the power sourcing equipment is triggered.

The powered device may determine a "power failure" status of the power sourcing equipment by detecting an output voltage of the power sourcing equipment. A "power failure" of the power sourcing equipment means that a power overload protection mechanism of the power sourcing equipment is triggered. This also means that a power output by the power sourcing equipment exceeds a safe range or a threshold for triggering protection. The powered device may detect a voltage signal and a current signal of an isolated power source by using a sampled signal of a built-in powered device chip or the isolated power source, or another proper technical means. This is not specifically limited herein.

In step S330, there are two options based on whether the power overload protection for the power sourcing equipment is triggered. If the power overload protection is triggered, that is, a "power failure" occurs on the power sourcing equipment, step S340 is performed. If the power overload protection is not triggered, that is, no "power failure" occurs on the power sourcing equipment, the process returns to the previous step S320, and a next power module is started according to the specific order. In this way, each time a power module is started, step S330 is performed to determine whether the power overload protection for the power sourcing equipment is triggered, so that the plurality of power modules P0, P1, P2, P3, . . . , and PN of the powered device are started one by one in the specific order, until all the plurality of power modules P0, P1, P2, P3, . . . , and PN are started or it is detected that the power overload protection is triggered after a specific power module Pi is started, where i is a number of the specific power module in the plurality of power modules P0, P1, P2, P3, . . . , and PN.

It should be understood that, in step S330, detecting that the power overload protection is triggered after the specific power module Pi is started means that a power module arranged before the specific module Pi in the specific order has been started. The specific order mentioned in step S320 may not indicate sequential startup based on magnitudes of numbers. For example, the plurality of power modules P0, P1, P2, P3, . . . , and PN are arranged in descending order of priorities of the power modules to obtain a first power module sequence. Startup in the specific order means that, from the first power module of the first power module sequence, the power modules are started one by one according to an order of the first power module sequence. Assuming that a priority of P3 is higher than that of P2, the priority of P2 is higher than that of P0, and the priority of P0 is higher than that of P1, P0, P1, P2, and P3 are arranged as P3-P2-P0-P1 in the first power module sequence, and are started in the specific order of P3-P2-P0-P1. Further, it is assumed that the powered device starts the power modules one by one in the specific order of P3-P2-P0-P1, and detects that the power overload protection is triggered after P1 is started. This means that P3, P2, and P0 are all started. In this case, a total external power requirement of the powered device after P1 is started should be a sum of power requirements of P0, P1, P2, and P3.

Step S340: Determine a power module combination of the powered device.

The power module combination of the powered device is determined from the plurality of power modules P0, P1, P2, P3, . . . , and PN according to the specific order mentioned in step S320 and based on the specific power module Pi mentioned in step S330, that is, power modules of the powered device that should be started and a corresponding combination are estimated based on execution results of steps S320 and S330. Specifically, the power module combination is determined in step S340 with reference to the specific order used in step S320. Assuming that it is detected that the power overload protection is not triggered after the plurality of power modules P0, P1, P2, P3, . . . , and PN are all started in step S330, the power module combination is all the power modules P0, P1, P2, P3, . . . , and PN. Assuming that it is detected that the power overload protection is triggered after the specific power module Pi is started in step S330, where i is a number of the specific power module in the plurality of power modules P0, P1, P2, P3, . . . , and PN, the power module combination is determined with reference to the specific order in step S320. In this way, the power module combination is determined based on a specific status of the powered device, thereby implementing a fine-grained power consumption grading operation for the powered device.

In some example embodiments, the plurality of power modules P0, P1, P2, P3, . . . , and PN are arranged in ascending order of powers required by the power modules to obtain a first power module sequence in step S320. Startup in the specific order means that, from the first power module of the first power module sequence, the power modules are started one by one according to an order of the first power module sequence. A detection status in step S330 is as follows: It is detected that the power overload protection is triggered after a specific power module Pi is started, where i is a number of the specific power module in a plurality of power modules P0, P1, P2, P3, . . . . PN. In this case, in step S340, a position of the specific power module Pi in the first power module sequence is determined first, and then a power module located before the position in the first power module sequence is used as the power module combination. For example, a power of P3 is lower than that of P2, the power of P2 is lower than that of P0, and the power of P0 is lower than that of P1. In this case, P0, P1, P2, and P3 are arranged as P3-P2-P0-P1 in the first power module sequence, and are started in the specific order of P3-P2-P0-P1. It is detected that the power overload protection is triggered after the specific power module P0 is started. In this case, the power module combination is P3, P2, and P0.

In some example embodiments, the plurality of power modules P0, P1, P2, P3, . . . , and PN are arranged in ascending order of powers required by the power modules to obtain a first power module sequence in step S320. Startup in the specific order means that, from the first power module of the first power module sequence, the power modules are arranged at internals according to an order of the first power module sequence in a manner of selecting every second power module. A detection status in step S330 is as follows: It is detected that the power overload protection is triggered after a specific power module Pi is started, where i is a number of the specific power module in a plurality of power modules P0, P1, P2, P3, . . . , PN. In this case, the following operations are sequentially performed in step S340: determining a position of the specific power module Pi in the first power module sequence; restarting the power sourcing equipment, and starting a second specific power module that is located before and that is adjacent to the position in the first power module sequence; when the power overload protection is not triggered, selecting the second specific power module and a power module located before the specific power module in the plurality of power modules according to the specific order as the power module combination; and when the power overload protection is triggered, selecting a power module located before the specific power module in the plurality of power modules according to the specific order as the power module combination. For example, a power of P3 is lower than that of P2, the power of P2 is lower than that of P0, and the power of P0 is lower than that of P1. In this case, P0, P1, P2, and P3 are arranged as P3-P2-P0-P1 in the first power module sequence, and are started in a specific order of P3-P0. It is detected that the power overload protection is triggered after the specific power module P0 is started. In this case, a position corresponding to the specific power module P0 in the first power module sequence is the third one from the front in the first power module sequence P3-P2-P0-P1. It is detected that the power overload protection is triggered. This means that a "power failure" occurs on the power sourcing equipment. Therefore, the power sourcing equipment is restarted, and then the second specific power module that is located before and that is adjacent to the position in the first power module sequence P3-P2-P0-P1 is started, that is, P2 before P0 in the first power module sequence P3-P2-P0-P1 is started. After P2 is started, power modules that have been started are P0, P2, and P3. P0 is the specific power module. P3 is a power module located before the specific power module P0 in the plurality of power modules according to the specific order P3-P0. P2 is a second specific power module that is located before and that is adjacent to the position in the first power module sequence P3-P2-P0-P1. Therefore, after the power sourcing equipment is restarted and the second specific power module P2 is started, if the power overload protection is not triggered, this means that the second specific power module P2 can be started to help maximize utilization of a power, and the power module combination is P2 and P3. On the contrary; if the power overload protection is triggered, the power module combination is P3. In this way, the power modules in the first power module sequence are started at intervals in a manner of selecting every second power module. Compared with starting the power modules in the first power module sequence one by one, this can significantly improve inspection efficiency. However, when it is detected that the power overload protection is triggered, it needs to be further determined whether the power overload protection is to be triggered if the second specific power module that is located before and that is adjacent to the position in the first power module sequence is started, and the power module combination is determined based on a determining result. This can significantly improve inspection efficiency while maximizing utilization of a power of the powered device, thereby implementing a fine-grained power consumption grading operation and precise power matching for the powered device.

In some example embodiments, the plurality of power modules P0, P1, P2, P3, . . . , and PN are arranged in ascending order of powers required by the power modules to obtain a first power module sequence in step S320. Startup in the specific order means that, from the first power module of the first power module sequence, the power modules are arranged at internals according to an order of the first power module sequence in a manner of selecting every third power module. A detection status in step S330 is as follows: It is detected that the power overload protection is triggered after a specific power module Pi is started, where i is a number of the specific power module in a plurality of power modules P0, P1, P2, P3, . . . . PN. In this case, the following operations are sequentially performed in step S340: determining a position of the specific power module Pi in the first power module sequence; restarting the power sourcing equipment, and starting a second specific power module that is located before and that is adjacent to the position in the first power module sequence; when the power overload protection is not triggered, selecting the second specific power module and a power module located before the specific power module in the plurality of power modules according to the specific order as the power module combination; when the power overload protection is triggered, restarting the power sourcing equipment, and starting a third specific power module, in the first power module sequence, that is located before and that is adjacent to a position of the second specific power module in the first power module sequence; when the power overload protection is not triggered, selecting the third specific power module and a power module located before the specific power module in the plurality of power modules according to the specific order as the power module combination; and when the power overload protection is triggered, selecting a power module located before the specific power module Pi in the plurality of power modules according to the specific order as the power module combination. It is assumed that power modules P0, P1, P2, P3, P4, and P5 are arranged in ascending order of powers required by the power modules to obtain a first power module sequence P0-P1-P2-P5-P4-P3. The power modules are started in a manner of selecting every third power module, that is, the specific order may be P0-P5. It is assumed that P5 is the specific power module. To be specific, it is detected that the power overload protection is triggered after the specific power module P5 is started. In this case, a second specific power module corresponding to P5 is P2. If it is detected that the power overload protection is not triggered after the power sourcing equipment is restarted and P2 is started, the power module combination is P0 and P2. If it is detected that the power overload protection is triggered after the power sourcing equipment is restarted and the P2 is started, the power sourcing equipment needs to be restarted again, and a third specific power module P1 needs to be started. Here, P1 is a third specific power module, in the first power module sequence P0-P1-P2-P5-P4-P3, that is located before and that is adjacent to a position of the second specific power module P2 in the first power module sequence. If it is detected that the power overload protection is not triggered after the power sourcing equipment is restarted and the third specific power module P1 is started, the power module combination is P0 and P1. If it is detected that the power overload protection is triggered, the power module combination is P0. This can significantly improve inspection efficiency while maximizing utilization of a power of the powered device, thereby implementing a fine-grained power consumption grading operation and precise power matching for the powered device.

In some example embodiments, in step S320, the plurality of power modules P0, P1, P2, P3, . . . , and PN are arranged in descending order of priorities of the power modules to obtain a first power module sequence. Startup in the specific order means that, from the first power module of the first power module sequence, the power modules are started one by one according to an order of the first power module sequence. A detection status in step S330 is as follows: It is detected that the power overload protection is triggered after a specific power module Pi is started, where i is a number of the specific power module in a plurality of power modules P0, P1, P2, P3, . . . , PN. In this case, in step S340, a position of the specific power module Pi in the specific order is determined first, and then a power module located before the position in the specific order is used as the power module combination. For example, a priority of P3 is higher than that of P2, the priority of P2 is higher than that of P0, and the priority of P0 is higher than that of P1. In this case, P0, P1, P2, and P3 are arranged as P3-P2-P0-P1 in the first power module sequence, and are started in the specific order of P3-P2-P0-P1. It is detected that the power overload protection is triggered after the specific power module P0 is started. In this case, the power module combination is P3, P2, and P0. Herein, an order of priorities of the power modules may be used to achieve different control objectives. For example, assuming that the powered device is an IP camera and an application scenario is a night operating scenario, a priority of a power module for a night operating mode may be increased, so that the power module for the night operating mode and a corresponding IP camera component are preferentially started, thereby improving night operating efficiency.

Step S350: Compare a load power determined based on the power module combination with a power determined according to LLDP, to determine a load power of the powered device.

The LLDP allows a device connected to a network to send information such as a main capability, a management address, a device identifier, and an interface identifier of the device to another device on the same network. When the powered device supports the LLDP, information such as a power consumption level of the powered device may be transmitted, through the LLDP, to an entity that manages the POE system, for example, the power sourcing equipment. In step S350, it may be detected whether the powered device supports the LLDP. If the powered device supports the LLDP, an LLDP protocol power may be used as the load power of the powered device. Alternatively, a load power may be determined based on the power module combination of the powered device that is determined in step S340, the load power is compared with the LLDP protocol power, and one of the powers is selected as the load power of the powered device. The power module combination is determined based on a current status of the powered device and an actually detected "power failure" status of the power sourcing equipment. Due to impact of various factors such as environmental factors, through comparison between the LLDP protocol power and the load power determined based on the power module combination, the load power determined based on the power module combination may be more suitable for a specific situation.

In some example embodiments, the power determined according to the LLDP, that is, the LLDP protocol power, may be compared with a total power of power modules that have been started after step S320. That is, between step S320 and step S330, the LLDP protocol power is compared with the total power of the started power modules, to determine the load power of the powered device. Alternatively, between step S320 and step S330, it is determined whether the powered device supports the LLDP, and if the powered device supports the LLDP, the LLDP protocol power is selected as the load power of the powered device, and the process ends.

In some example embodiments, after it is detected that the power overload protection for the power sourcing equipment is triggered, it may be determined whether the powered device supports the LLDP. If the powered device supports the LLDP, the LLDP protocol power is selected as the load power of the powered device, and the process ends.

In this way, in the method shown in FIG. 3, the plurality of power modules of the powered device are started one by one in the specific order, until all the plurality of power modules are started or it is detected that the power overload protection is triggered after the specific power module is started, thereby implementing a fine-grained power consumption grading operation and precise power matching for a specific case. A waste of power consumption and a line loss are considered, thereby maximizing utilization of a power of the powered device. In addition, in the method shown in FIG. 3, an optimized configuration is further performed through comparison with the LLDP protocol power and with reference to an LLDP support status of the powered device.

Figure 4:
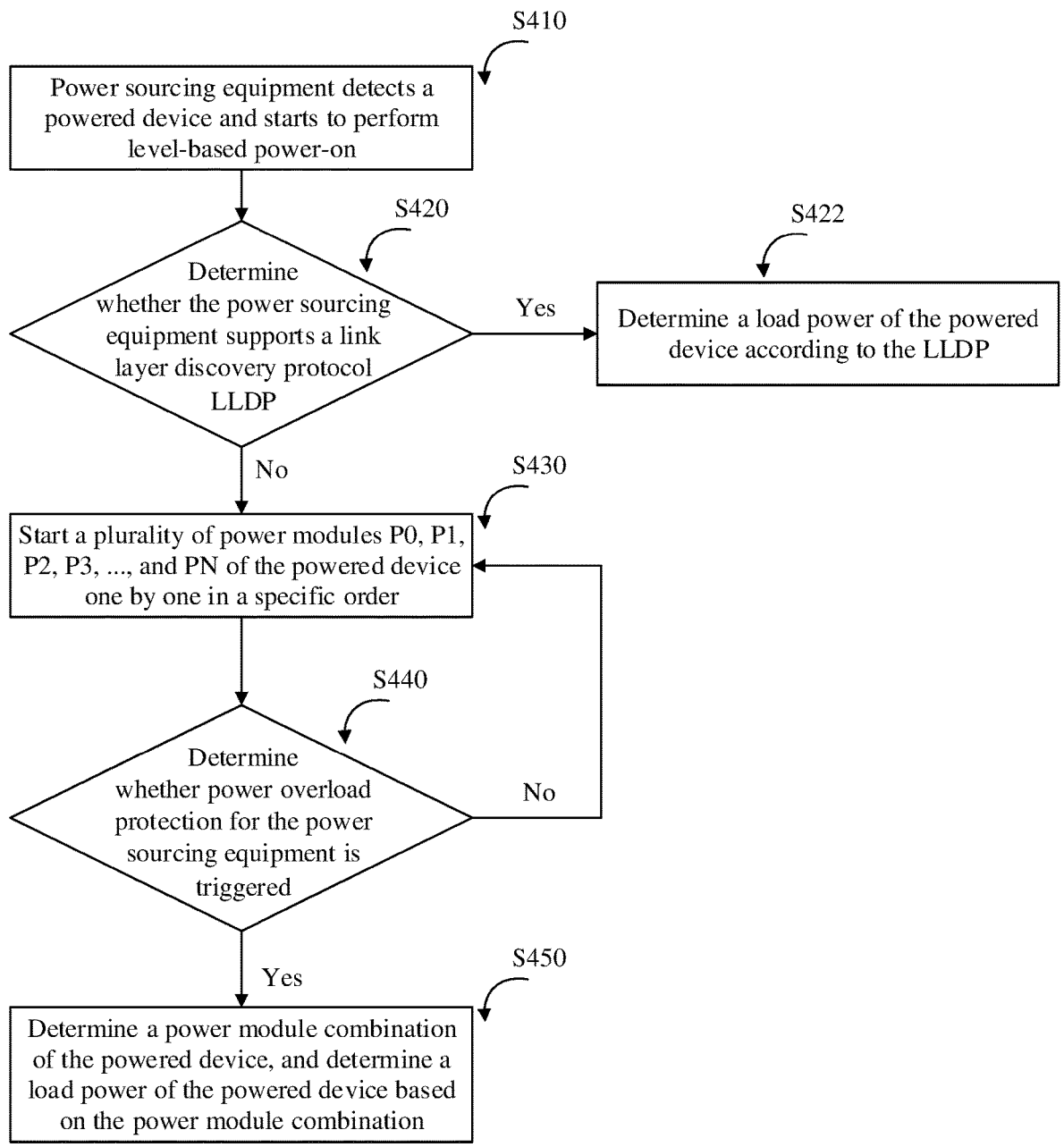
FIG. 4 is a schematic flowchart of a power control method for a powered device in another implementation according to an embodiment of this application.

FIG. 4 is a schematic flowchart of a power control method for a powered device in another implementation according to an embodiment of this application. Specifically, the method includes the following steps.

Step S410: Power sourcing equipment detects a powered device and starts to perform level-based power-on.

Details of step S410 are basically the same as those of step S310, and details are not described herein again.

Step S420: Determine whether the power sourcing equipment supports LLDP.

The LLDP allows a device connected to a network to send information such as a main capability, a management address, a device identifier, and an interface identifier of the device to another device on the same network. When the powered device supports the LLDP, information such as a power consumption level of the powered device may be transmitted, through the LLDP, to an entity that manages a POE system, for example, the power sourcing equipment. In step S420, it is detected whether the powered device supports the LLDP. If the powered device supports the LLDP, step S422 is performed to determine a load power of the powered device according to the LLDP, and the process ends. If the powered device does not support the LLDP, step S430 is performed.

Step S430: Start a plurality of power modules P0, P1, P2, P3, . . . , and PN of the powered device one by one in a specific order.

Details of step S430 are basically the same as those of step S320, and details are not described herein again.

Step S440: Determine whether power overload protection for the power sourcing equipment is triggered.

Details of step S440 are basically the same as those of step S330, and details are not described herein again.

Step S450: Determine a power module combination of the powered device, and determine a load power of the powered device based on the power module combination.

Details of step S450 are basically the same as those of step S340, and details are not described herein again. It should be understood that, in step S420, it is first determined whether the powered device supports the LLDP, and if the powered device supports the LLDP, step S422 is performed, and the process ends. Therefore, in step S450, no comparison needs to be performed with an LLDP protocol power.

In this way, in the method shown in FIG. 4, the plurality of power modules of the powered device are started one by one in the specific order, until all the plurality of power modules are started or it is detected that the power overload protection is triggered after the specific power module is started, thereby implementing a fine-grained power consumption grading operation and precise power matching for a specific case. A waste of power consumption and a line loss are considered, thereby maximizing utilization of a power of the powered device. In addition, in the method shown in FIG. 4, an optimized configuration is further performed through comparison with the LLDP protocol power and with reference to an LLDP support status of the powered device.

As shown in FIG. 1 to FIG. 4, in some example embodiments, a network-based power supply system includes power sourcing equipment and a powered device. The power sourcing equipment supplies power to the powered device through a network. The network-based power supply system determines a load power of the powered device, to determine a corresponding power consumption level and indicate the power sourcing equipment to provide a corresponding power, that is, control a power of the powered device. A power consumption grading method for the network-based power supply system or a power control method for the powered device includes: When the powered device detects that power overload protection for the power sourcing equipment is not triggered, the powered device starts a plurality of power modules of the powered device one by one in a specific order, until all the plurality of power modules are started or the powered device detects that the power overload protection for the power sourcing equipment is triggered after a specific power module is started, where the powered device detects, based on a voltage signal and a current signal that are received from the network, whether the power overload protection for the power sourcing equipment is triggered. When the powered device detects that the power overload protection for the power sourcing equipment is triggered, the network-based power supply system selects, according to the specific order and based on the specific power module, one or more of the plurality of power modules as a power module combination of the powered device. When all the plurality of power modules are started, the network-based power supply system selects the plurality of power modules as the power module combination. The network-based power supply system determines a load power of the powered device and a corresponding power consumption level based on the power module combination.

A specific embodiment provided in this application may be implemented by any one or a combination of hardware, software, firmware, or a solid-state logic circuit, and may be implemented with reference to signal processing, control, and/or a dedicated circuit. A device or equipment provided in a specific embodiment of this application may include one or more processors (for example, a microprocessor, a controller, a digital signal processor (DSP), an application-specific integrated circuit (ASIC), or a field programmable gate array (FPGA)). These processors process various computer-executable instructions to control an operation of the device or the equipment. A device or equipment provided in a specific embodiment of this application may include a system bus or a data transmission system that couples all components together. The system bus may include any one of different bus structures or any combination of different bus structures, for example, a memory bus or a memory controller, a peripheral bus, a universal serial bus, and/or a processor or a local bus that uses any one of the plurality of bus structures. A device or equipment provided in a specific embodiment of this application may be provided separately, or may be a part of a system, or may be a part of another device or equipment.

A specific embodiment provided in this application may include a computer-readable storage medium or be combined with a computer-readable storage medium, for example, one or more storage devices that can provide non-temporary data storage. The computer-readable storage medium/storage device may be configured to store data, a programmer, and/or instructions. The device or the equipment is enabled to implement related operations by using the data, the programmer, and/or the instructions when a processor of the device or the equipment provided in the specific embodiment of this application executes the data, the programmer, and/or the instructions. The computer-readable storage medium/storage device may include one or more of the following features: volatile, non-volatile, dynamic, static, readable/writable, read-only, random access, sequential access, location addressable, file addressable, and content addressable. In one or more example embodiments, the computer-readable storage medium/storage device may be integrated into a device or equipment provided in a specific embodiment of this application, or belong to a common system. The computer-readable storage medium/storage device may include an optical storage device, a semiconductor storage device, a magnetic storage device, and/or the like; or may include a random access memory (RAM), a flash memory, a read-only memory (ROM), an erasable programmable read-only memory (EPROM), an electrically erasable programmable read-only memory (EEPROM), a register, a hard disk, a removable magnetic disk, a recordable and/or rewritable optical disk (CD), a digital versatile disc (DVD), a massive storage device, or an appropriate storage medium in any other form.

The foregoing descriptions are implementations of embodiments of this application. It should be noted that sequential adjustment, combination, and deletion may be performed on the steps in the methods described in specific embodiments of this application according to an actual requirement. In the foregoing embodiments, the description of each embodiment has respective focuses. For a part that is not described in detail in an embodiment, reference may be made to related descriptions in other embodiments. It may be understood that the structures shown in embodiments of this application and accompanying drawings do not constitute a specific limitation on a related device or system. In some other embodiments of this application, the related device or system may include more or fewer components than those shown in specific embodiments and accompanying drawings, or some components are combined, or some components are split, or components are disposed in different manners. A person skilled in the art understands that various modifications or changes may be made to operations and details of the methods and the device layouts recorded in specific embodiments without departing from the spirit and scope of specific embodiments of this application; and several improvements and refinements may be further made without departing from the principles of embodiments of this application. The improvements and refinements shall fall within the protection scope of this application.

What is claimed is:

1. A power consumption grading method for a network-based power supply system, wherein the network-based power supply system comprises power sourcing equipment and a powered device, the power sourcing equipment supplies power to the powered device over a network, and the method comprises:
   in response to detecting, by the powered device, that power overload protection for the power sourcing equipment is not triggered, starting, by the powered device, a plurality of power modules of the powered device one by one in a specific order until either all the plurality of power modules are started or the powered device detects that the power overload protection for the power sourcing equipment is triggered after a specific power module of the plurality of power modules is started, wherein the powered device detects, based on a voltage signal and a current signal that are received from the network, whether the power overload protection for the power sourcing equipment is triggered;
   in response to detecting, by the powered device, that the power overload protection for the power sourcing equipment is triggered, selecting, by the network-based power supply system according to the specific order and based on the specific power module, one or more of the plurality of power modules as a power module combination of the powered device;
   and
   determining, by the network-based power supply system, a load power of the powered device and a corresponding power consumption level based on the power module combination.

2. The method according to claim 1, wherein the starting, by the powered device, a plurality of power modules of the powered device one by one in a specific order comprises:
   starting power modules of a first power module sequence, beginning from the first power module of the first power module sequence, one by one according to an order of the first power module sequence, wherein the plurality of power modules are arranged in ascending order of powers required by the power modules to obtain the first power module sequence.

3. The method according to claim 2, wherein the selecting, by the network-based power supply system according to the specific order and based on the specific power module, one or more of the plurality of power modules as a power module combination of the powered device comprises:
   determining a position of the specific power module in the first power module sequence; and
   selecting a power module located before the position in the first power module sequence as the power module combination.

4. The method according to claim 1, wherein the starting, by the powered device, a plurality of power modules of the powered device one by one in a specific order comprises:
   starting power modules of a first power module sequence, beginning from the first power module of the first power module sequence, at intervals according to an order of the first power module sequence in a manner of selecting every second power module, wherein the plurality of power modules are arranged in ascending order of powers required by the power modules to obtain the first power module sequence.

5. The method according to claim 4, wherein the selecting, by the network-based power supply system according to the specific order and based on the specific power module, one or more of the plurality of power modules as a power module combination of the powered device comprises:
   determining a position of the specific power module in the first power module sequence;
   restarting the power sourcing equipment, and starting a second specific power module that is located before and that is adjacent to the position in the first power module sequence;
   in response to the fact that the power overload protection is not triggered, selecting the second specific power module and a power module located before the specific power module in the plurality of power modules according to the specific order as the power module combination; and
   in response to the power overload protection being triggered, selecting the power module located before the specific power module in the plurality of power modules according to the specific order as the power module combination.

6. The method according to claim 1, wherein the starting, by the powered device, a plurality of power modules of the powered device one by one in a specific order comprises:
starting power modules of a first power module sequence, beginning from the first power module of the first power module sequence, at intervals according to an order of the first power module sequence in a manner of selecting every third power module, wherein the plurality of power modules are arranged in ascending order of powers required by the power modules to obtain the first power module sequence.

7. The method according to claim 6, wherein the selecting, by the network-based power supply system according to the specific order and based on the specific power module, one or more of the plurality of power modules as a power module combination of the powered device comprises:
determining a position of the specific power module in the first power module sequence;
restarting the power sourcing equipment, and starting a second specific power module that is located before and that is adjacent to the position in the first power module sequence;
in response to the power overload protection is not being triggered, selecting the second specific power module and a power module located before the specific power module in the plurality of power modules according to the specific order as the power module combination;
in response to the triggering of the power overload protection, restarting the power sourcing equipment, and starting a third specific power module, in the first power module sequence, that is located before and that is adjacent to a position of the second specific power module in the first power module sequence;
in response to the power overload protection is not being triggered, selecting the third specific power module and the power module located before the specific power module in the plurality of power modules according to the specific order as the power module combination; and
in response to the triggering of the power overload protection, selecting the power module located before the specific power module in the plurality of power modules according to the specific order as the power module combination.

8. The method according to claim 1, wherein the starting, by the powered device, a plurality of power modules of the powered device one by one in a specific order comprises:
starting power modules of a first power module sequence, beginning from the first power module of the first power module sequence, one by one according to an order of the first power module sequence, wherein the plurality of power modules are arranged in descending order of priorities of the plurality of power modules to obtain the first power module sequence.

9. The method according to claim 8, wherein the selecting, by the network-based power supply system according to the specific order and based on the specific power module, one or more of the plurality of power modules as a power module combination of the powered device comprises:
determining a position of the specific power module in the first power module sequence; and
selecting a power module located before the position in the first power module sequence as the power module combination.

10. The method according to claim 8, wherein a priority of a power module related to a basic function of the powered device is higher than a priority of a power module related to an extended function of the powered device.

11. A powered device powered based on a network, wherein the powered device receives electric energy over the network, and the powered device comprises:
a detector, wherein the detector is configured to detect, based on a voltage signal and a current signal that are received from the network, whether power overload protection is triggered;
a plurality of power modules; and
a controller, wherein
the controller is configured to:
in response to detecting, by the detector, that the power overload protection is not triggered, start the plurality of power modules one by one in a specific order until either all the plurality of power modules are started or the detector detects that the power overload protection is triggered after a specific power module of the plurality of power modules is started;
in response to detecting, by the detector, that the power overload protection is triggered, select, according to the specific order and based on the specific power module, one or more of the plurality of power modules as a power module combination of the powered device; and
determine a load power of the powered device based on the power module combination.

12. The powered device according to claim 11, wherein the starting a plurality of power modules of the powered device one by one in a specific order comprises:
starting power modules of a first power module sequence, beginning from the first power module of the first power module sequence, one by one according to an order of the first power module sequence, wherein the plurality of power modules are arranged in ascending order of powers required by the power modules to obtain the first power module sequence.

13. The powered device according to claim 12, wherein the selecting, according to the specific order and based on the specific power module, one or more of the plurality of power modules as a power module combination of the powered device comprises:
determining a position of the specific power module in the first power module sequence; and
selecting a power module located before the position in the first power module sequence as the power module combination.

14. The powered device according to claim 11, wherein the starting a plurality of power modules of the powered device one by one in a specific order comprises:
starting power modules of a first power module sequence, beginning from a first power module of a first power module sequence, at intervals according to an order of the first power module sequence in a manner of selecting every second power module, wherein the plurality of power modules are arranged in ascending order of powers required by the power modules to obtain the first power module sequence.

15. The powered device according to claim 14, wherein the selecting, according to the specific order and based on the specific power module, one or more of the plurality of power modules as a power module combination of the powered device comprises:
determining a position of the specific power module in the first power module sequence;

restarting the power sourcing equipment, and starting a second specific power module that is located before and that is adjacent to the position in the first power module sequence;

in response to the power overload protection not being triggered, selecting the second specific power module and a power module located before the specific power module in the plurality of power modules according to the specific order as the power module combination; and in response to the triggering of the power overload protection, selecting the power module located before the specific power module in the plurality of power modules according to the specific order as the power module combination.

16. The powered device according to claim 11, wherein the starting a plurality of power modules of the powered device one by one in a specific order comprises:

starting power modules of a first power module sequence, beginning from the first power module of the first power module sequence, at intervals according to an order of the first power module sequence in a manner of selecting every third power module, wherein the plurality of power modules are arranged in ascending order of powers required by the power modules to obtain the first power module sequence.

17. The powered device according to claim 16, wherein the selecting, according to the specific order and based on the specific power module, one or more of the plurality of power modules as a power module combination of the powered device comprises:

determining a position of the specific power module in the first power module sequence;

restarting the power sourcing equipment, and starting a second specific power module that is located before and that is adjacent to the position in the first power module sequence;

when the power overload protection is not triggered, selecting the second specific power module and a power module located before the specific power module in the plurality of power modules according to the specific order as the power module combination;

when the power overload protection is triggered, restarting the power sourcing equipment, and starting a third specific power module, in the first power module sequence, that is located before and that is adjacent to a position of the second specific power module in the first power module sequence;

in response to the fact that the power overload protection, selecting the third specific power module and the power module located before the specific power module in the plurality of power modules according to the specific order as the power module combination; and in response to the triggering of the power overload protection, selecting the power module located before the specific power module in the plurality of power modules according to the specific order as the power module combination.

18. The powered device according to claim 11, wherein the starting a plurality of power modules of the powered device one by one in a specific order comprises:

starting power modules of the a power module sequence, beginning from the first power module of the first power module sequence, one by one according to an order of the first power module sequence, wherein the plurality of power modules are arranged in descending order of priorities of the plurality of power modules to obtain the first power module sequence.

19. The powered device according to claim 18, wherein the selecting, according to the specific order and based on the specific power module, one or more of the plurality of power modules as a power module combination of the powered device comprises:

determining a position of the specific power module in the first power module sequence; and selecting a power module located before the position in the first power module sequence as the power module combination.

20. A network-based power supply system, wherein the network-based power supply system comprises a power sourcing equipment, and the network-based power supply system determines a power consumption level of a powered device based on a load power of the powered device, wherein the powered device receives electric energy over a network, and the powered device comprises:

a detector, wherein the detector is configured to detect, based on a voltage signal and a current signal that are received from the network, whether power overload protection is triggered;

a plurality of power modules; and a controller, wherein the controller is configured to:

in response to detecting, by the detector, that the power overload protection is not triggered, start the plurality of power modules one by one in a specific order until either all the plurality of power modules are started or the detector detects that the power overload protection is triggered after a specific power module is started;

in response to detecting, by the detector, that the power overload protection is triggered, select, according to the specific order and based on the specific power module, one or more of the plurality of power modules as a power module combination of the powered device; and determine a load power of the powered device based on the power module combination.

* * * * *